US010185498B2

(12) United States Patent
Roberts

(10) Patent No.: US 10,185,498 B2
(45) Date of Patent: Jan. 22, 2019

(54) WRITE BUFFER DESIGN FOR HIGH-LATENCY MEMORIES

(71) Applicant: Advanced Micro Devices, Inc., Sunnyvale, CA (US)

(72) Inventor: David A. Roberts, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 61 days.

(21) Appl. No.: 15/184,996

(22) Filed: Jun. 16, 2016

(65) Prior Publication Data

US 2017/0364262 A1 Dec. 21, 2017

(51) Int. Cl.
*G06F 3/06* (2006.01)
(52) U.S. Cl.
CPC .............. *G06F 3/061* (2013.01); *G06F 3/068* (2013.01); *G06F 3/0616* (2013.01); *G06F 3/0656* (2013.01); *G06F 3/0659* (2013.01)
(58) Field of Classification Search
CPC .................................................. G06F 3/0656
See application file for complete search history.

(56) References Cited

U.S. PATENT DOCUMENTS

| 6,460,122 B1* | 10/2002 | Otterness | G06F 11/1076 711/122 |
| 9,690,713 B1* | 6/2017 | Khermosh | G06F 12/0893 |
| 2012/0124294 A1* | 5/2012 | Atkisson | G06F 11/108 711/135 |
| 2012/0254507 A1* | 10/2012 | Chang | G06F 12/0868 711/103 |
| 2012/0297131 A1* | 11/2012 | Chung | G06F 12/0215 711/105 |

OTHER PUBLICATIONS

Handy, Jim, the Cache Memory book, 1998, Academic Press, 2nd ed., p. 44 (Year: 1998).*

* cited by examiner

*Primary Examiner* — Gary W. Cygiel
(74) *Attorney, Agent, or Firm* — Liang & Cheng, PC

(57) ABSTRACT

A memory system includes a write buffer, a main memory having a higher latency than the write buffer, and a memory controller. In response to a write request indicating first data for storing at a write address in the main memory, the memory controller adds a new write entry in the write buffer, where the new write entry includes the write address and the first data, and updates a pointer of a previous write entry in the write buffer to point to the new write entry. In response to a write-back instruction, the memory controller traverses a plurality of write entries stored in the write buffer, and writes into the main memory second data of the previous write entry and the first data of the new write entry.

18 Claims, 5 Drawing Sheets

WRITE BUFFER DESIGN FOR HIGH-LATENCY MEMORIES

TECHNICAL FIELD

This disclosure relates to the field of memory and, in particular, to buffering of high-latency memory in a computing system.

BACKGROUND

Many modern computer systems utilize non-volatile memory (NVM) for data storage. NVM retains its contents even when power is not being supplied to the NVM, and can thus retain its contents through a power-cycle of the computer system. One common type of NVM technology is flash memory.

Some newer computing systems utilize NVM as random-access memory (RAM); however, frequent writes to NVM can cause wear-out and eventual failure of the NVM. In addition, read or write accesses to NVM typically have higher latency than accesses to volatile memory types.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Non-volatile memories are likely to scale further and provide higher capacity than existing dynamic random access memory (DRAM) technologies, but have higher read and significantly higher write latency. To reduce performance impact and wear-out effects due to writes, a write buffering scheme that relies on a hash table and a linked list may be implemented for buffering write accesses to NVM memories. In one embodiment, such a write buffer can also provide cache-like behavior. In contrast with a cache, however, the write buffer is simpler and does not need a separate cache tag array. The write buffer could be implemented in hardware, software or firmware.

Figure 1:
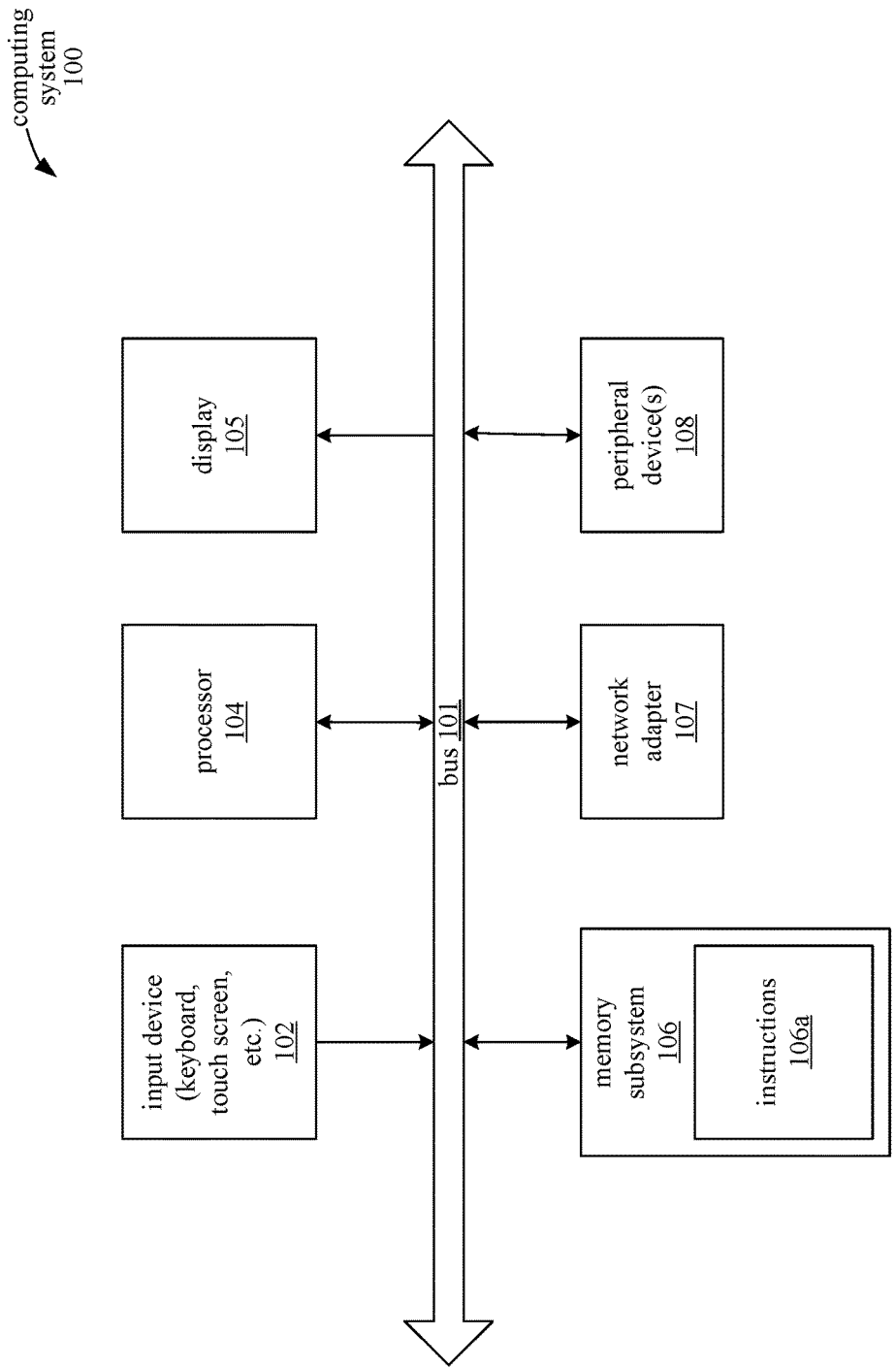
FIG. 1 illustrates an embodiment of a computing system.

FIG. 1 illustrates an embodiment of a computing system 100 which may implement a write buffer for buffering writes to a NVM, as described above. In general, the computing system 100 may be embodied as any of a number of different types of devices, including but not limited to a laptop or desktop computer, mobile phone, server, etc. The computing system 100 includes a number of components 102-108 that can communicate with each other through a bus 101 or other form of interconnect. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices that can be used by the computing system 100.

Computing system 100 includes a processor 104 that is configured to receive and execute instructions 106a that are stored in the memory subsystem 106. In alternative embodiments, the processor 104 can be any processing element, including but not limited to a central processing unit (CPU), a graphics processing unit (GPU), an accelerated processing unit (APU), a field programmable gate array (FPGA), a digital signal processor (DSP), or any other application-specific integrated circuit (ASIC).

Memory subsystem 106 includes memory devices used by the computing system 100, such as random-access memory (RAM) modules, read-only memory (ROM) modules, hard disks, and other non-transitory computer-readable media. The memory included in memory subsystem 106 is used as main memory in the computing system 100 and may be implemented using a variety of memory technologies, including NVM. Additional types of memory can be included in memory subsystem 106 or elsewhere in computing system 100. For example, cache memory and registers may also be present in the processor 104 or on other components of the computing system 100.

Figure 2:
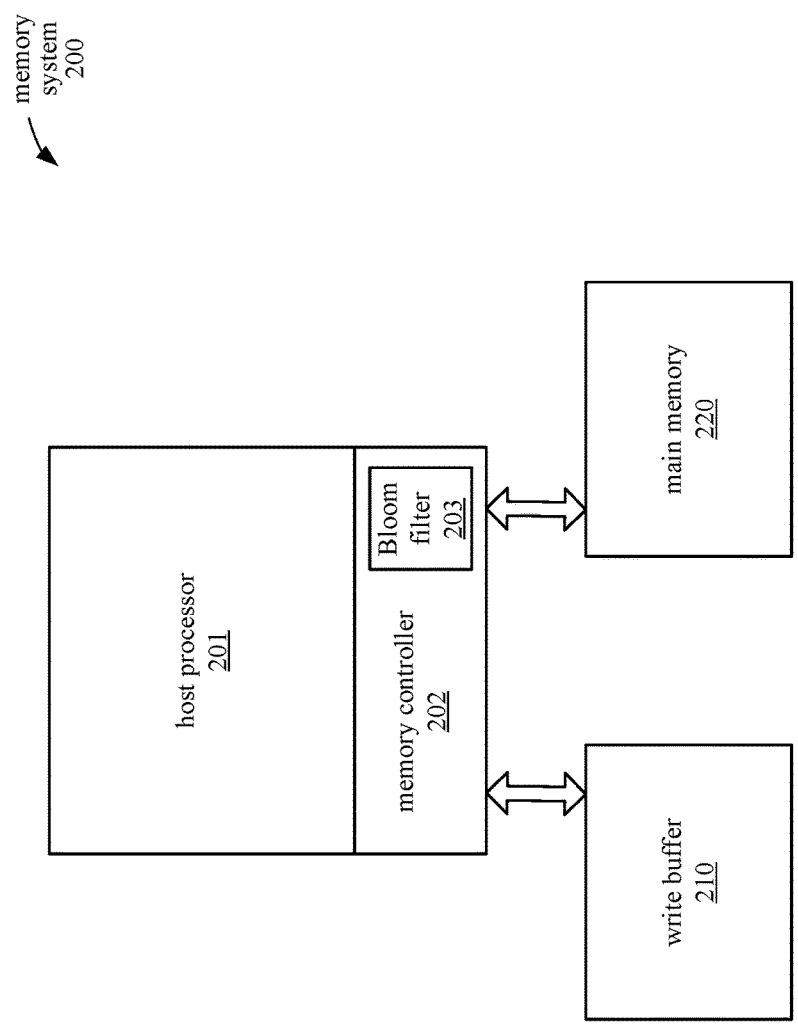
FIG. 2 illustrates a memory system in a computing system, according to an embodiment.

FIG. 2 illustrates a memory system 200 within the computing system 100. The memory system 200 includes components of the computing system 100 that are involved in the operation of the main memory 220. The processor 104 of the computing system 100 corresponds to the host processor 201, which includes memory controller 202. Memory controller 202 manages read and write requests to and from the main memory 220, and also controls the storage of entries in the write buffer 210. The memory system 200 includes write buffer 210 and the main memory 220, which are part of the memory subsystem 106 of the computing system 100.

In one embodiment, the write buffer 210 is implemented using a fast and low-latency memory (relative to the main memory 220) such as DRAM, and may be implemented on a different physical integrated circuit chip than the main memory 220 and the host processor 201. The write buffer 210 utilizes a combination of a hash table and a linked list to store write entries for write requests directed at the main memory 220.

The main memory 220 is implemented using NVM or, alternatively, may be implemented using some other memory technology that has a higher latency or experiences a higher wear rate than the write buffer. The main memory 220 also has a higher capacity than the write buffer 210.

The memory controller 202 is communicatively coupled with both the write buffer 210 and the main memory 220 (e.g., through bus 101). In one embodiment, the memory controller 202 is implemented in a field-programmable gate array (FPGA); alternatively, the memory controller 202 can be implemented using logic on the same die as the host processor 201.

During operation of the computing system 100, the host processor 201 issues write requests indicating data to be written to one or more addresses at the main memory 220. The memory controller 202 includes logic that responds to such a write request from the host processor 201 by writing the data to the main memory 220 at the requested address. If the main memory is contended, the memory controller 202 detects the contention and instead stores a new write entry for the request in the write buffer 210. The write entry includes the write address of the request, as well as the address in the main memory at which the data was requested to be written.

When adding the new write entry, the memory controller 202 also identifies a previous write entry that is the most recently added write entry prior to the new write entry, and updates a 'next write' pointer (NWP) of the previous write entry to refer to the new write entry. Thus, the memory controller 202 can create a chronological (i.e., oldest to newest) linked list of multiple write entries in the write buffer 210, with a write entry corresponding to each of multiple write requests issued by the host processor.

In one embodiment, the memory controller 202 may further optimize performance by leaving a memory row open in the write buffer in response to determining that other write requests will be buffered within a threshold amount of time. Thus, after adding the new write entry, the memory controller 202 adds a subsequent new write entry in response to a subsequent write request prior to closing the memory row that was opened for writing the new write entry. This behavior reduces the time for updating the NWP.

Thus, in the case of memory contention at the main memory 220, the memory controller 202 creates in the write buffer 210 a new write entry for the write request. In one embodiment, the memory controller 202 performs a write-back of the buffered writes in response to detecting at least a threshold amount of available bandwidth for the main memory. In other words, the memory controller 202 detects when the main memory 220 is no longer contended and has sufficient spare bandwidth for performing the write-back operation. In alternative embodiments, the host processor 201 or some other logic may determine whether the main memory has at least the threshold amount of available bandwidth for performing the write-back. To avoid the possibility of the write buffer becoming full, a maximum age can be specified for write buffer entries before they are forced to be written back to main memory.

Upon detecting that the main memory 220 has sufficient bandwidth or the age threshold has been reached, the host processor 201 or the memory controller 202 initiates the write-back operation (e.g., by issuing a write-back instruction). The memory controller 202 performs the write-back operation by traversing the linked list of write entries, starting from the first chronological write entry (i.e., the 'head' entry) and following the NWPs to subsequent write entries. For each of the write entries in the linked list, the data of the write entry is copied to the main memory 220 as the entry is traversed, the write entry is invalidated, and the linked list is updated by manipulating the head pointer. By this process, some or all of the buffered write data is written to the main memory 220 in the original chronological order of the write requests, and at the appropriate addresses as indicated in the write requests.

In one embodiment, the memory controller 202 maintains a Bloom filter 203. For example, the Bloom filter 203 may be implemented as a bit array stored in memory in the memory controller, along with hash logic for determining bit positions corresponding to memory addresses to be added to the Bloom filter 203. In alternative embodiments, the bit array and/or logic of the Bloom filter 203 may be implemented within parts of the memory system 200 other than the memory controller 202.

The memory controller 202 maintains the Bloom filter 203 by, for each write entry that is added to the write buffer, adding an address of the write entry to the Bloom filter 203. The hash logic of the Bloom filter 203 is used to determine bit positions corresponding to the address of the write entry, and the bit positions are set in the Bloom filter. The Bloom filter 203 can thus be used to determine if the address of a particular write request is "probably in the write buffer 210" or "definitely not in the write buffer 210".

In response to an incoming write request, the memory controller 202 checks the Bloom filter 203 to determine whether the write buffer 210 should be updated instead of the main memory 220. Thus, if the Bloom filter 203 indicates that the address of the write request is "probably in the write buffer 210", then the memory controller 202 attempts to locate the write entry or entries in the write buffer 210 and updates the data in the write entry for the write request, or the memory controller 202 writes-back the entries to the main memory 220 before executing the write request.

However, if the Bloom filter 203 indicates that the address of the write request is "definitely not in the write buffer 210", then the data is written to the main memory without a look-up of the address in the write buffer 210, or a new entry is allocated in the write buffer without searching it for an older value to update. The Bloom filter 203 thus reduces the number of look-ups directed to the write buffer 210.

The memory controller 202 also uses the Bloom filter 203 to check the write buffer 210 in response to incoming read requests. If the Bloom filter 203 indicates that the requested data could be in the write buffer 210 (i.e., the Bloom filter 203 returns a match for the read address), the memory controller 202 issues contemporaneous reads to both the write buffer 210 and the main memory 220. If the data is present in the write buffer 210, the memory controller 202 returns the data from the write buffer 210 and ignores the stale data from the main memory 220. If the data is not in the write buffer 210, it returns a 'miss' and the memory controller 202 returns the data from the main memory 220. By serializing the operations and checking the write buffer first, energy can be saved by not having to access main memory on a write buffer hit. However, if the write buffer did not contain the address, latency is increased by waiting to access main memory.

However, if the Bloom filter 203 indicates that the requested data is not in the write buffer 210 (i.e., the Bloom filter does not return a match for the read address), then the memory controller 202 issues the read to the main memory 220 and returns the data read from the main memory 220.

Figure 3:
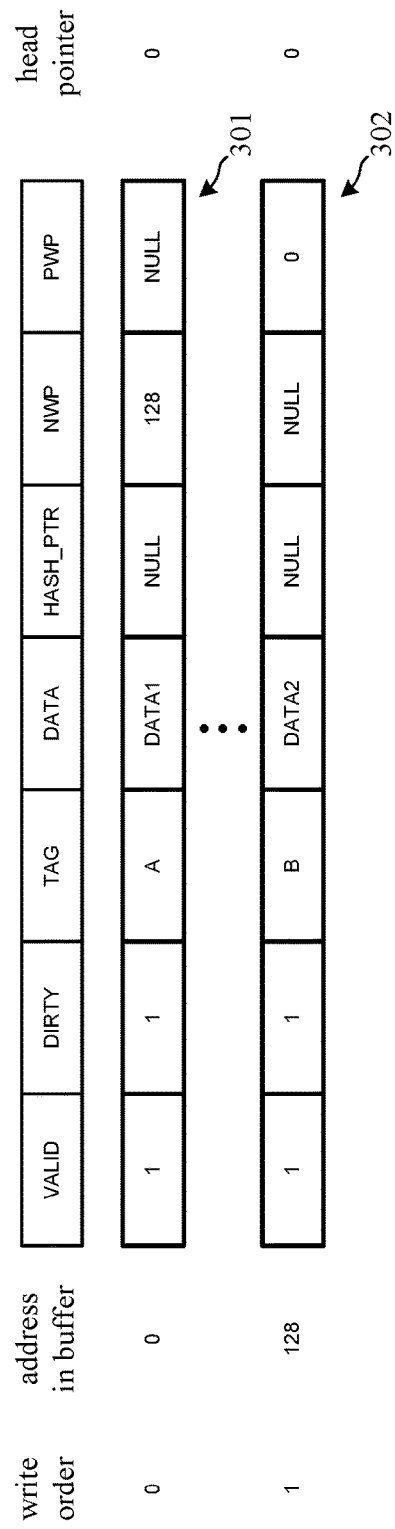
FIG. 3 illustrates write entries in a write buffer, according to an embodiment.

FIG. 3 illustrates write entries 301 and 302 that can be stored in the write buffer 210, according to an embodiment. In FIG. 3, the 'write order' indicates the chronological order of the write entries 301 and 302; specifically, entry 301 having write order '0' is written prior to entry 302 having write order '1'. The 'address in buffer' for each write entry indicates the hash address of the write entry in the write buffer 210; write entry 301 is located at address '0' in the write buffer 210, while write entry 302 is located at address '128'. The 'head pointer' indicates the 'head' of the linked list of write entries, which is the oldest write entry in the linked list. The head write entry is not referenced by any other write entry in the linked list, and every other write entry is directly or indirectly referenced from the head write entry. The head pointer could be included in each write entry or, as illustrated in FIG. 3, may not be included in the write entries. For example, the head pointer could be stored in memory controller 202, at a static location in the write buffer 210, etc.

Each of the write pointers 301 and 302 includes the following fields: a valid bit ('VALID'), a dirty bit ('DIRTY'), an address field ('TAG'), a data field ('DATA'), a hash pointer ('HASH_PTR'), and a next write pointer ('NWP'). The address field TAG and the data field DATA store the address and data, respectively, of the original write request. Thus, when the memory controller 202 creates a write entry, it copies the address and data of the originating write request into the TAG and DATA fields, respectively, of the write entry. Note that if some bits of the address can be determined from the row index (as in a cache memory) then the tag only needs to store the remaining address bits.

Each write entry also includes a next write pointer (NWP) that points to the next subsequent write entry (i.e., the next newer write entry). For example, the NWP of entry 301 points to the address 128, which is the hash address of the entry 302. Write entry 302 is chronologically the next subsequent write entry after write entry 301. In other words, the write entry 302 is generated from a write request that is the next subsequent write request following the write request from which write entry 301 was generated. If there is no newer write entry, the NWP is null. The memory controller 202 traverses the linked list of write entries (e.g., in response to a read or write-back operation) by following the head pointer to the first write entry, then following the NWP of each write entry to traverse the list until a null NWP is reached.

As an example, the write entries 301 and 302 in FIG. 3 each represent a write request issued from the host processor 201. A first write request to write DATA1 at address A is received by the memory controller 202, which creates write entry 301 at hashed address 0 of the write buffer 210. Since write entry 301 is the first write entry in the buffer 210, the head pointer is set to address 0. The next write request to write DATA2 at address B is received by the memory controller 202 and is hashed to address 128 in the write buffer 210, in write entry 302. The NWP of the previous write entry 301 is concurrently updated to point to the hash address of write entry 302, which is 128. In addition to the head pointer, a tail pointer can be maintained so that the current tail can be quickly located and updated in the event of a new write being inserted.

In one embodiment, each write entry also includes a previous write pointer (PWP) that points the previous write entry (i.e., the most recent prior write entry). For example, the PWP of write entry 302 stores the hash address '0', referring to the previous write entry 301. Since write entry 301 is at the head of the linked list, there is no previous write entry and the PWP of write entry 301 is NULL. The implementation of a doubly linked list including a NWP and PWP for each entry enables traversal of the linked list in either direction, and further enables fast insertion and deletion of entries.

For example, in a singly linked list, if a write request is received that is directed to an existing buffered address (e.g., corresponding to the nth write entry), the value can be updated in-place; however, moving the nth entry to the tail of the list would entail searching from the head of the list to find the (n−1)th entry (i.e., the previous entry) so that the NWP of the previous entry can be updated. In a doubly linked list, the memory controller 202 could 1) locate the (n−1)th entry via the PWP of the nth entry, 2) update the NWP of the (n−1)th entry to refer to the (n+1)th entry, 3) locate the (n+1)th entry via the NWP of the nth entry, 4) update the PWP of the (n+1)th entry to refer to the (n−1)th entry, and 5) move the nth entry to the tail of the linked list by updating the NWP of the last entry to refer to the nth entry and the NWP and PWP of the nth entry to refer to NULL and to the last entry, respectively.

The VALID bit of a write entry records whether the write entry is still valid. For example, when a write-back including the write entry has already been performed, the VALID bit is deasserted. The DIRTY bit can be used in embodiments where the write buffer 210 has cache-like functionality, and is asserted to indicate that changes to the data in the write entry have not been reflected in the main memory.

The hash pointer HASH_PTR for each write entry can be used to store hash addresses for referencing other write entries in the write buffer 210 for hash table chaining in the event of collisions that occur when write entries are being created. For example, if the memory controller 202 attempts to add an entry at a hash address that already contains an existing entry, a hash collision occurs. In the case of such a hash collision, the memory controller 202 chains the new write entry by creating the new write entry and updating the hash pointer of the existing write entry to point to the new write entry.

Figure 4:
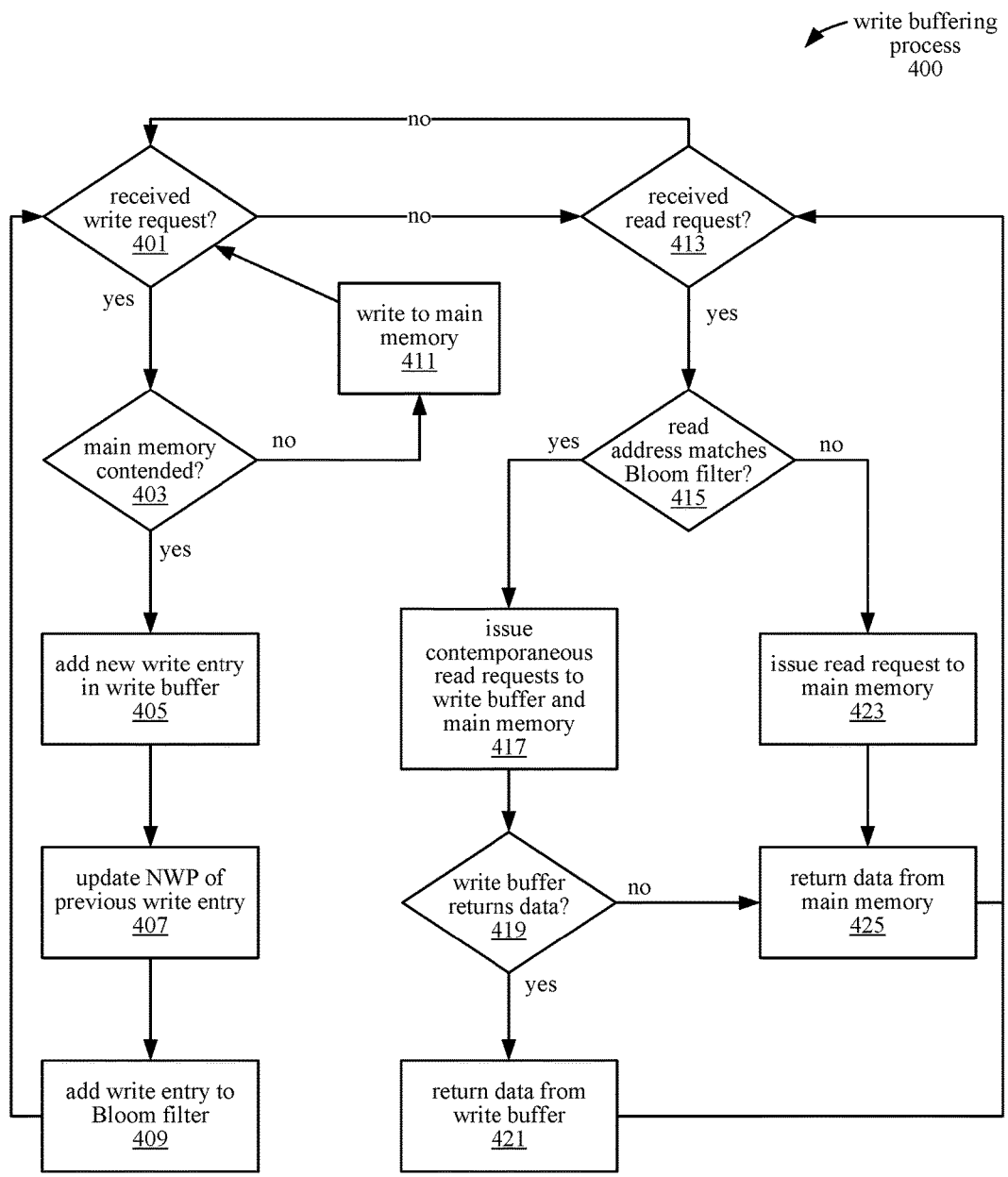
FIG. 4 is a flow diagram illustrating a write buffering process, according to an embodiment.

FIG. 4 is a flow diagram illustrating a write buffering process 400, according to an embodiment. The operations of process 400 are performed by the components of memory system 200, including the host processor 201, memory controller 202, Bloom filter 203, write buffer 210, and main memory 220. In alternative embodiments, some or all of the operations of process 400 may be performed by other components in the computing system 100.

The process 400 begins by looping between blocks 401 and 413; here, the memory controller 202 waits for memory requests (i.e., write requests or read requests) to be issued from the host processor 201. If, at block 401, the memory controller 202 receives a write request directed to the main memory 220, then the process 400 continues from block 401 to block 403. Blocks 403-411 represent a process for handling the write request.

At block 403, the memory controller 202 determines whether the main memory 220, to which the write request is directed, is contended. In one embodiment, the main memory 220 is contended if a concurrent access or other conflict prevents write access to the main memory 220.

If the memory controller 202 receives a write request when the main memory is not contended (as determined at block 403) the process 400 continues to block 411. At block 411, the memory controller 202 writes the data of the write request to the address in main memory as specified in the write request without buffering the write. From block 411, the process 400 continues back to block 401 to continue handling additional write requests.

At block 403, if the main memory is contended, then the process 400 continues at block 405. At block 405, the memory controller 202 adds a new write entry for the write request in the write buffer 210. The new write entry includes the address and data of the original write request (as illustrated, for example, in FIG. 3). For an embodiment where each write entry includes a PWP, the memory controller 202 also updates the PWP of the new write entry to refer to the previous write entry (i.e., the most recently added write entry before the new write entry). For example, the PWP field of the new write entry may be updated to store the hash address of the previous write entry. From block 405, the process 400 continues at block 407.

At block 407, the memory controller 202 updates the NWP of the previous write entry to reference the new write entry. For example, the memory controller 202 may change the NWP of the previous write entry from a NULL value to the hash address of the new write entry. From block 407, the process 400 continues at block 409.

At block 409, the memory controller 202 adds the write address of the write request to the Bloom filter 203. Hash logic for the Bloom filter generates bit positions corresponding to the write address, and the bit positions are set in the Bloom filter. From block 409, the process 400 continues back to block 401 to continue handling additional write requests.

Thus, after adding the new write entry, the memory controller 202 may receive subsequent a write request (at block 401) and, if the main memory 220 is still contended (block 403), the memory controller 202 adds a subsequent new write entry for the subsequent write request at block 405. The process 400 thus loops through blocks 401-411 when buffering multiple write requests that are received during a time when the main memory 220 is contended, creating a write entry in write buffer 210 for each write request that is received during this time. In one embodiment, the memory controller 202 may hold open a memory row of the write buffer 210 when creating multiple write entries. In other words, the memory controller 202 may open the memory row for a first write entry, then create one or more subsequent write entries prior to closing the memory row that was opened for creating the first write entry.

In one embodiment, the host processor 201 also issues read requests indicating an address of the main memory 220 from which data is to be retrieved. At block 413, if the memory controller 202 receives a read request from the host processor 201, the process 400 continues at block 415.

At block 415, the memory controller 202 determines whether the Bloom filter 203 returns a match for the read address specified in the read request. Specifically, the hash logic of the Bloom filter is used to determine bit positions corresponding to the read address, which are matched against the bit positions in the Bloom filter's bit array. If all of the bit positions are asserted, then a match is returned. Otherwise, if at least one of the bit positions is not asserted, then there is no match. If no match is returned by the Bloom filter, then no write entry exists in the write buffer 210 for the requested read address. The memory controller 202 thus issues the read request to the main memory, at block 423, and returns the data retrieved from the main memory, at block 425. From block 425, the process 400 continues back to block 413.

At block 415, if the Bloom filter returns a match for the read address, then a write address could possibly exist in the write buffer for the requested read address, and the process 400 continues at block 417. At block 417, since the requested data could be in either the write buffer 210 or the main memory 220, the memory controller contemporaneously issues the read request to both the write buffer 210 and to the main memory 220 in parallel. From block 417, the process 400 continues at block 419.

At block 419, if the requested read address corresponds to a write entry in the write buffer 210, then the write buffer 210 returns the requested data and the process 400 continues at block 421. At block 421, the memory controller 202 returns the data from the write buffer 210, ignoring the data (presumed to be stale) that is returned by the main memory 220 in response to the read request. At block 419, if the requested read address does not correspond to a write entry in the buffer 210, then the buffer 210 returns a 'miss' and the memory controller 202 returns the data from the main memory 220, as provided at block 425. From block 421 or 425, the process 400 continues back to block 413.

Figure 5:
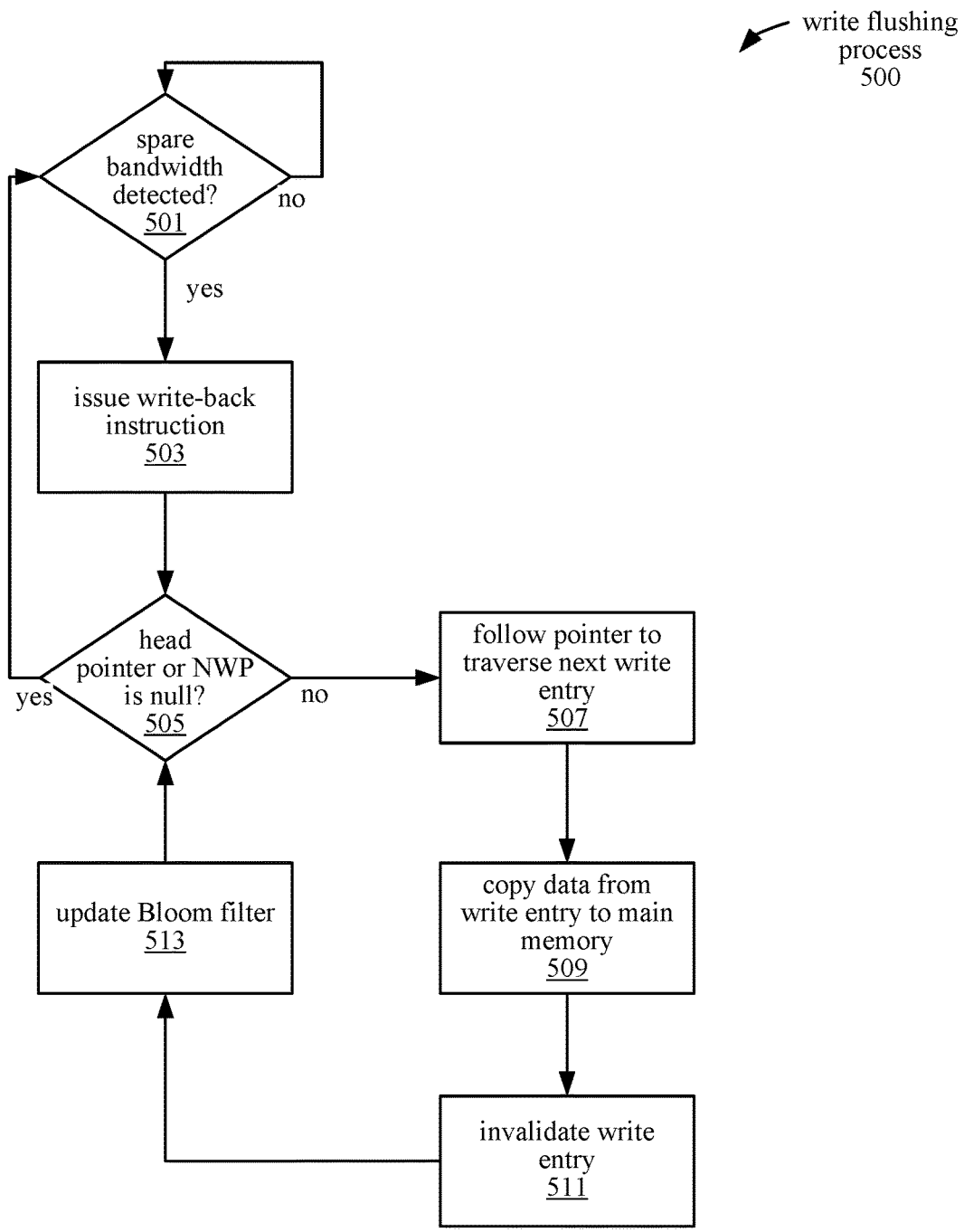
FIG. 5 is a flow diagram illustrating a write flushing process, according to an embodiment.

By the operation of process 400, write entries can be added to the write buffer 210 in response to write requests received when the main memory 220 is contended. In one embodiment, these write requests may be removed from the write buffer by a write flushing process 500, as illustrated in FIG. 5. The operations of process 500 may be performed concurrently with the operations of process 400; that is, process 500 may be performed in parallel with process 400.

At block 501, the memory controller 202 determines whether the main memory 220 has sufficient spare bandwidth to perform a write-back operation of the write entries in the write buffer 210. In one embodiment, the main memory 220 may be determined to have sufficient bandwidth if the main memory 220 has an amount of available bandwidth that exceeds at least a predetermined threshold. In alternative embodiments, the spare bandwidth determination may be performed by other components in the memory system 200 or the computing system 100. At block 501, if the main memory does not have sufficient spare bandwidth to perform the write-back, the process 500 loops back to block 501 to continue checking for spare bandwidth.

At block 501, if the main memory 220 has sufficient spare bandwidth to perform a write-back of the buffered writes in the write buffer 210, the process 500 continues at block 503. At block 503, a write-back instruction is issued, which may be any signal or message that causes the memory controller 202 to initiate a write-back of the buffered writes to the main memory 220. In one embodiment, the write-back instruction may be issued by the host processor 201 in response to detecting that the main memory 220 has sufficient spare bandwidth. In an alternative embodiment, the memory controller 202 may itself initiate the write-back operation in response to detecting sufficient spare bandwidth. From block 503, the process 500 continues at block 505.

At block 505, the memory controller 202 begins traversing the linked list of write entries in the write buffer 210 by locating the head pointer, which references the first write entry in the linked list. If the head pointer is NULL, then there are no write entries to write-back, and the process 500 continues back to block 501. Otherwise, the process 500 continues to block 507, where the first write entry is located by following the address of the head pointer. From block 507, the process 500 continues to block 509.

At block 509, the memory controller 202 copies the data from the DATA field of the write entry to the appropriate address (indicated in the TAG field of the write entry) of the main memory 220. From block 509, the process 500 continues at block 511. At block 511, the memory controller 202 invalidates the write entry by deasserting the VALID bit of the write entry. From block 511, the process 500 continues at block 513.

At block 513, the memory controller 202 updates the Bloom filter 203 to reflect the removal of the write entry from the write buffer 210. In one embodiment, the Bloom filter 203 is a counting filter, such that the insertion of a write entry address increments, rather than merely asserting, the bit positions in the Bloom filter 203. The write entry is then removed from the Bloom filter 203 by using the Bloom filter's hash logic to again determine the bit positions corresponding to the address of the write entry, then decrementing the bit positions in the Bloom filter. From block 513, the process 500 continues back to block 505.

The process 500 thus repeats the operations of blocks 505, 507, 509, 511, and 513 in a loop to perform a write-back operation including all of the write entries in the linked list. Blocks 505-513 repeat until a write entry having a NWP set to NULL is reached, indicating the end of the linked list. At block 505, when the last write entry (having a NWP set to NULL) is reached, the process 500 continues back to block 501. The write flushing process 500 thus repeats the operations of blocks 501-513 to monitor the available bandwidth of the main memory 220 and flush the write entries from the write buffer 210 when sufficient bandwidth is available.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the memory system 200 and/or portions thereof carried on the computer-readable storage medium may be a database or other data structure which can be read by a program and used, directly or indirectly, to fabricate the hardware comprising the memory system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates which also represent the functionality of the hardware comprising the memory system 200. The netlist may then be placed and routed to produce a data set describing geometric shapes to be applied to masks. The masks may then be used in various semiconductor fabrication steps to produce a semiconductor circuit or circuits corresponding to the memory system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the scope of the embodiments as set forth in the appended claims. The specification and drawings are, accordingly, to be regarded in an illustrative sense rather than a restrictive sense.

What is claimed is:

1. A memory system, comprising:
a write buffer;
a main memory having a higher latency than the write buffer;
a memory controller coupled with the main memory and with the write buffer, wherein the memory controller is configured to:
create a chronological linked list of write entries by:
in response to a write request indicating first data for storing at a write address in the main memory, adding a new write entry in the write buffer, wherein the new write entry includes the write address and the first data, and
in response to the write request, updating a pointer of a previous write entry in the write buffer to point to the new write entry;
issue a write-back instruction in response to detecting at least a threshold amount of available bandwidth for the main memory; and
in response to the write-back instruction, traverse a plurality of write entries stored in the write buffer including the previous write entry and the new write entry, and write into the main memory second data of the previous write entry and the first data of the new write entry.

2. The memory system of claim 1, wherein:
the write buffer comprises dynamic random access memory (DRAM), and
the main memory comprises non-volatile memory (NVM).

3. The memory system of claim 1, wherein:
for each write entry of the plurality of write entries, the write entry includes an address field, a data field, a valid bit, a dirty bit, a hash pointer, and a next write pointer that points to another write entry of the plurality of write entries that is newer than the write entry, and
the pointer of the previous write entry is the next write pointer of the previous write entry.

4. The memory system of claim 1, wherein the memory controller is further configured to, after adding the new write entry, add a subsequent new write entry in response to a subsequent write request prior to closing a memory row opened for the new write entry.

5. The memory system of claim 1, wherein the memory controller is further configured to traverse the new write entry and the previous write entry by following the pointer of the previous write entry to the new write entry.

6. The memory system of claim 5, wherein the memory controller is further configured to invalidate each of the previous write entry and the new write entry in response to the write-back instruction.

7. The memory system of claim 1, further comprising a Bloom filter, wherein the memory controller is further configured to:
in response to the write request, add the write address to the Bloom filter; and
in response to a read request indicating a read address, determine whether the Bloom filter returns a match for the read address.

8. The memory system of claim 7, wherein the memory controller is further configured to, if the Bloom filter returns a match for the read address, contemporaneously issue the read request to the write buffer and to the main memory.

9. A method, comprising:
creating a chronological linked list of write entries by, in response to a write request indicating first data for storing at a write address in a main memory,
adding a new write entry in a write buffer, wherein the new write entry includes the write address and the first data, and
updating a pointer of a previous write entry in the write buffer to point to the new write entry;
issuing a write-back instruction in response to detecting at least a threshold amount of available bandwidth for the main memory; and
in response to the write-back instruction,
traversing a plurality of write entries stored in the write buffer including the previous write entry and the new write entry, and
writing into the main memory second data of the previous write entry and the first data of the new write entry, wherein the main memory has a higher latency than the write buffer.

10. The method of claim 9, further comprising, after adding the new write entry, adding a subsequent new write entry in response to a subsequent write request prior to closing a memory row opened for the new write entry.

11. The method of claim 9, wherein traversing the new write entry and the previous write entry further comprises following the pointer of the previous write entry to the new write entry.

12. The method of claim 11, further comprising invalidating each of the previous write entry and the new write entry in response to the write-back instruction.

13. The method of claim 9, further comprising:
in response to the write request, adding the write address to a Bloom filter; and
in response to a read request indicating a read address, determining whether the Bloom filter returns a match for the read address.

14. The method of claim 13, further comprising, if the Bloom filter returns a match for the read address, contemporaneously issuing the read request to the write buffer and to the main memory.

15. A system, comprising:
a write buffer;
a main memory having a higher latency than the write buffer;
a host processor comprising a memory controller, wherein the memory controller is coupled with the main memory and with the write buffer, and wherein the memory controller is configured to:
create a chronological linked list of write entries by, for each write request of a plurality of write requests issued by the host processor, wherein the write request indicates first data for storing at a write address in the main memory,
adding a new write entry to a plurality of write entries in the write buffer, wherein the new write entry includes the write address and the first data, and
updating a next write pointer of a previous write entry in the write buffer to point to the new write entry, and
in response to a write-back instruction issued by the host processor, traverse the plurality of write entries in chronological order by, for each write entry of the plurality of write entries, copying data of the write entry to the main memory, wherein the host processor is configured to issue the write-back instruction in response to detecting at least a threshold amount of available bandwidth for the main memory.

16. The system of claim 15, wherein the memory controller is further configured to traverse the plurality of write entries by, for each write entry of the plurality of write entries, following the pointer of the write entry to a next write entry of the plurality of write entries, and invalidating the write entry.

17. The system of claim 15, wherein:
the write buffer comprises dynamic random access memory (DRAM), and
the main memory comprises non-volatile memory (NVM).

18. The system of claim 15, further comprising a Bloom filter, wherein the memory controller is further configured to:
in response to the write request, add the write address to the Bloom filter; and
in response to a read request indicating a read address, determine whether the Bloom filter returns a match for the read address, and
if the Bloom filter returns a match for the read address, contemporaneously issue the read request to the write buffer and to the main memory.

* * * * *